(No Model.)
G. W. ROBERTS.
NUT LOCK.
No. 368,785. Patented Aug. 23, 1887.
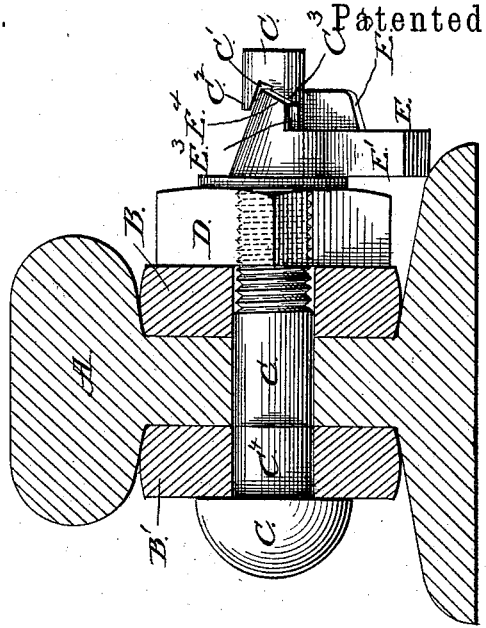
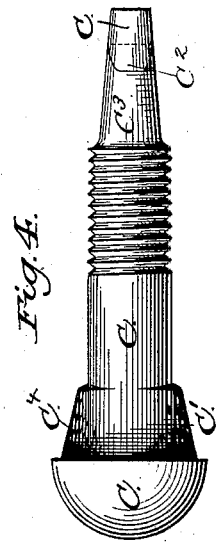
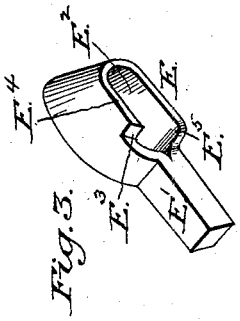
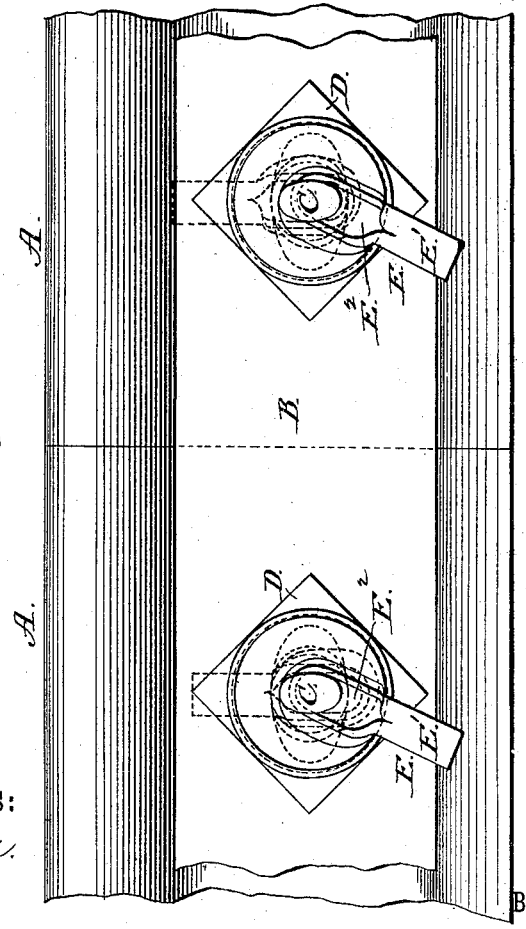
WITNESSES:
John A. Ellis.
C. Sedgwick.
INVENTOR:
G. W. Roberts
BY Munn & Co
ATTORNEYS.

UNITED STATES PATENT OFFICE.

GEORGE W. ROBERTS, OF WALLA WALLA, WASHINGTON TERRITORY.

NUT-LOCK.

SPECIFICATION forming part of Letters Patent No. 368,785, dated August 23, 1887.

Application filed April 5, 1887. Serial No. 233,721. (No model.)

*To all whom it may concern:*

Be it known that I, GEORGE W. ROBERTS, of Walla Walla, in the county of Walla Walla and Washington Territory, have invented a new and Improved Nut-Lock, of which the following is a full, clear, and exact description.

My invention has for its object to provide an improved nut-lock so constructed and arranged that it will hold the nut securely in place and may be readily applied or removed, thus adapting it particularly for use on railroad-rails.

The invention consists in certain novel features of construction and combinations of parts, hereinafter fully described and definitely claimed.

Reference is to be had to the accompanying drawings, forming a part of this specification, in which similar letters of reference indicate corresponding parts in all the figures.

Figure 1 is an elevation of a rail-joint to which my improvement has been applied. Fig. 2 is an end view, partly in section, through the rail and fish-plates. Figs. 3 and 4 are detail views of the locking-piece and bolt, respectively.

A designates the meeting ends of the rails, and B B' designate the fish-plates by which the joint is tied. The bolts C, each having an oval enlargement, $C^4$, near its head, are passed through the fish-plates and the web of the rail, as usual, and are prevented from turning by the engagement of the enlargements $C^4$ with corresponding holes in the rear fish-plate, B', all in the ordinary manner. The nut D is screwed on the bolt against the fish-plate B.

To adapt the front unthreaded end part of the bolt C for the reception of the novel locking-piece E employed, it is tapered off on opposite sides toward the elliptical end, and in it is cut an inclined slot, C', leading from the end of the threaded portion to within a short distance from the end, thereby forming an upper lug, $C^2$. The bolt metal at the base of the slot C' is rounded, so as to form an oblique conical section, $C^3$.

The locking-piece E consists of a short heavy shank, E', formed on its end with an oblong eye, $E^2$, the interior surface of which flares at the ends to correspond with the taper of the upper side of the conical section $C^3$ of the bolt and at the sides to correspond with the taper of the sides of said conical section. The eye $E^2$ is widened on one side of the locking-piece to form a ridge, which, starting with a low beveled shoulder, $E^3$, a short distance beyond the junction of the eye and its shank, extends, by an outward incline, $E^4$, to the outer end of the eye, around and back on the opposite side of the same, and terminates in a higher shoulder, $E^5$. The outer surface of the eye also flares from the outer edge of the ridge.

In applying the locking-piece E to the peculiarly-constructed bolt, the nut D having been screwed up tight, said piece E is held in a vertical position with the weighted shank upward and the ridge outward, and the extreme end of the eye $E^2$ is slipped over the end of the bolt, which fits the same loosely, all as indicated in dotted lines at the right of Fig. 1. The locking-piece is then lowered vertically until the inner end of the eye $E^2$ rests on the conical section $C^3$ of the bolt, as indicated in dotted lines at the left of Fig. 1. The shoulder $E^3$ being now clear of the lug $C^2$ on the bolt and abreast of the slot C' of the same, the locking-piece is turned by its shank to the left, the inclined ridge $E^4$ riding in the slot C' until it finds a seat against the outer end of the slot, and the locking-piece taking the position shown in full lines in the figures. The nut B is then unscrewed slightly to clamp the locking-piece in place, a washer or washers being used, as shown in the drawings, when the nut will not easily reach the locking-piece. The inclined ridge $E^4$ on the locking-piece allows for variations in the bolts and nuts. The locking-piece is similarly released by moving it in a reverse direction to that described. The tendency of the nut being constantly to turn off the bolt, such movement, together with the weighted shank, serves to maintain the locking-piece in its downward locking position, so that it cannot be raised and released by heavy jars.

Having thus described my invention, what I claim as new, and desire to secure by Letters Patent, is—

1. The combination, with the slotted bolt and nut, of the locking-piece E, having the shank E', and the oblong eye $E^2$, having the ridge $E^4$ and shoulder $E^3$, substantially as shown and described.

2. The combination, with the bolt having an inclined slot and the nut, of a locking-piece having a weighted shank, an oblong interiorly-flaring eye, and a ridge starting with a shoulder, $E^3$, and extending with an incline, $E^4$, around the edge of the eye, substantially as shown and described.

3. As an improved article of manufacture, the locking-piece E, formed with the weighted shank $E'$, the oblong interiorly-flaring eye $E^2$, and the inclined ridge $E^4$, starting a short distance from the junction of the eye and shank and continuing around the edge of the eye, substantially as shown and described.

GEORGE W. ROBERTS.

Witnesses:
J. D. LAMAN,
E. D. LAMAN.